United States Patent [19]

Elser

[11] 4,285,266
[45] Aug. 25, 1981

[54] SERVO STEERING GEAR

[75] Inventor: Dieter Elser, Essingen, Fed. Rep. of Germany

[73] Assignee: Zahnradfabrik Friedrichshafen, AG., Friedrichshafen, Fed. Rep. of Germany

[21] Appl. No.: 79,204

[22] Filed: Sep. 26, 1979

[30] Foreign Application Priority Data

Oct. 6, 1978 [DE] Fed. Rep. of Germany ....... 2843592

[51] Int. Cl.³ .................... F15B 9/10; F15B 13/042
[52] U.S. Cl. .................... 91/375 A; 91/420; 91/446
[58] Field of Search ............ 91/375 A, 375 R, 467, 91/420, 470

[56] References Cited

U.S. PATENT DOCUMENTS

| | | | |
|---|---|---|---|
| 3,749,112 | 7/1973 | Nishikowa | 91/420 |
| 3,817,151 | 6/1974 | Kawabota et al. | 91/375 A |
| 4,009,641 | 3/1977 | Rohde et al. | 92/169 |

*Primary Examiner*—Paul E. Maslousky
*Attorney, Agent, or Firm*—Zalkind & Shuster

[57] ABSTRACT

A pressure operated valve restricts outflow of fluid from a servomotor to which inflow of fluid is controlled by valve elements torsionally interconnected by a torsion bar for limited relative rotation. The pressure operated valve, mounted within one of the valve elements, is displaced by operating pressure of the inflowing fluid in the direction of the outflowing fluid to partially close a return flow valve passage and is under the bias of a spring urging the valve to a position permitting unrestricted outflow through said return flow valve passage.

9 Claims, 2 Drawing Figures

SERVO STEERING GEAR

BACKGROUND OF THE INVENTION

The present invention relates to a servo steering gear mechanism having a servomotor to which a pressurized operating medium is conducted from an inlet port and from which the operating medium is returned through an outlet port to a low pressure reservoir.

A problem common to such servo steering gear mechanism is the development of unpleasant and disturbing noises of a hissing nature in response to attainment of a predetermined pressure level therein. Such noises arise by virtue of flow through valve controlled passages under a pressure differential. The noise level increases as the pressure differential increases. Since a sharp reduction in operating pressure occurs during flow through the return passage of the valve structure, the noise or hissing sounds become particularly disturbing at valve surfaces of the return flow passage. This problem is dealt with by the inventions as disclosed in prior copending application Ser. No. 68,363, filed Aug. 21, 1979 for Auxiliary Power Steering and in copending application Ser. No. 102,327, filed Dec. 11, 1979 for Rotary Slide Steering Valve For Auxiliary Power Steerings, said related copending applications being owned in common with the present application by the same assignee.

Heretofore, attempts have been made to improve pressure conditions in the return flow valve passages by volumetric accumulation of fluid. Any prolonged accumulation of fluid along the return flow path is, however, undesirable for steering gear mechanism having unbalanced pressure operated control valves because of a deterioration of steering return movement. Also, additional heating of the fluid operating medium occurs requiring the expenditure of more energy.

It is therefore an important object of the present invention to provide a servo steering gear mechanism of the aforementioned unbalanced type in which return flow pressure conditions are improved to reduce the hissing noise level without fluid accumulation.

SUMMARY OF THE INVENTION

In accordance with the present invention, the rotatable control valve element of the servo gear mechanism has an axial bore therein in fluid communication with the servo outflow passage for the fluid operating medium through a valve return passage in the valve element and a passage in the valve sleeve. A valve piston is disposed within the axial bore biased by a spring to a position in which the valve return passage is completely open to conduct unrestricted flow. The valve piston has a pressure face exposed to fluid under inlet operating pressure through valve controlled passages in the valve element and valve sleeve to exert a piston actuating force opposed by the bias of the spring.

The valve piston when displaced from its initial position against the bias of its spring, restricts flow through the valve return passage to the outflow port of the servo gear mechanism. Since there is no pressure balancing of the valve piston, the flow of the fluid operating medium through the valve return passage does not affect movement of the valve piston under control of the inlet pressure and the opposing spring bias which will determine the dimensioning of the valve return passage. By incorporating the valve piston within the same housing as the servo gear mechanism, a noise-reducing improvement in return flow pressure is achieved in an inexpensive manner.

The valve piston is furthermore provided with differential pressure surfaces arranged to effect displacement thereof against its spring bias in response to return inflow of fluid from the inlet port. Such movement of the valve piston in a return flow restricting direction, is limited by one end of a torsion bar interconnecting the valve element and the valve sleeve in order to correspondingly limit pressure drop produced in the return flow path by restriction of the valve passage.

A flow-through axial bore within the valve piston establishes fluid communication between the bearings for the valve element and valve sleeve and the return flow passage to recycle lubricating and leakage fluid. Thus, leakage losses are minimized and overloading of low pressure seals is avoided.

BRIEF DESCRIPTION OF DRAWINGS

A specific embodiment of the invention is hereinafter described with reference to the accompanying drawings, in which.

DETAILED DESCRIPTION OF PREFERRED EMBODIMENT

Figure 1:
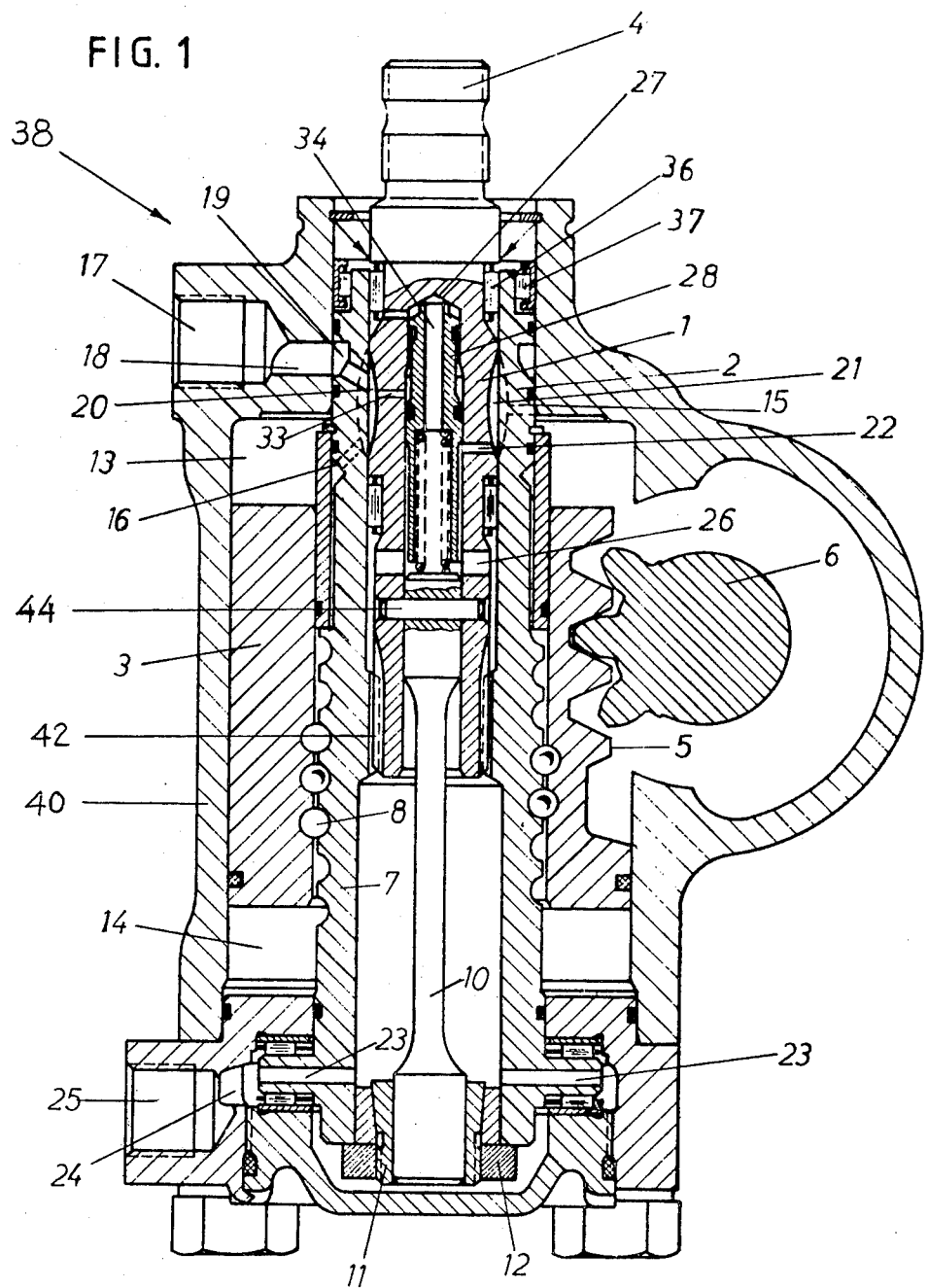
FIG. 1 is a longitudinal section view of a servo steering gear mechanism in accordance with the present invention.

Referring now to the drawings in detail, a combined steering control valve and servo gear assembly 38 is shown for use with a fluid power assisted steering system. The steering valve and servo assembly includes a housing denoted by reference numeral 40 within which a valve slide element 1 is enclosed together with a valve sleeve 2 within which the valve slide element 1 is rotatably mounted. The housing 40 forms a pressure cylinder for a piston 3 axially displaced in response to angular displacement from a neutral position of a steering spindle 4 rigidly connected to the valve slide element 1. The piston 3 is externally formed with rack teeth 5 in meshing engagement with gear teeth on a steering shaft 6. Axial motion of the piston is thereby converted into rotational movement of the steering shaft. The piston 3 is internally formed with a spiral groove for driving engagement with a worm shaft 7 by means of groove engaging ball elements 8 in a manner well known in the art.

The worm shaft 7 is formed integrally with the valve sleeve 2 and is provided internally with a lost motion connection 42 to one axial end of the valve slide element 1 thereby establishing a rotational connection to the steering spindle 4 after it is rotated from a neutral position by a predetermined amount. A torsionally elastic connection is established between the worm shaft 7 and the steering spindle 4 by means of torsion bar 10 having opposite ends thereof respectively connected by a swivel pin 44 to the valve slide element 1 and to the adjacent axial end of the worm shaft 7 by means of a conical sleeve 11. The conical sleeve 11 is removably secured to the worm shaft 7 by means of the wedging action of an assembly nut 12. In this manner, corrective adjustment of the valve mechanism may be effected.

As a result of the foregoing arrangement, limited relative angular displacement between the steering spindle 4 and worm shaft 7 is accommodated during the transfer of torque. Angular displacement of the valve slide element 1 by means of the steering spindle 4 relative to the valve sleeve 2 controls the flow of fluid by means of valve passages disposed within the valve slide element and the valve sleeve regulate pressure in a manner well known in the art as exemplified by U.S. Pat. No. 3,273,465, to Eddy. Pressurized fluid is thereby supplied to one of the pressure chambers 13 and 14, depending on the rotational direction of the steering spindle 4 while the other chamber is exhausted.

The pressure chambers 13 and 14 are formed about the worm shaft 7 at opposite axial ends of the piston 3. Inlet valve passages include a bore 15 formed in the valve sleeve 2 supplying fluid to the pressure chamber 13 and a bore 16 in the valve sleeve supplying fluid to pressure chamber 14 through the spiral grooving in the worm shaft 7 and piston 3. Accordingly, fluid under pressure is conducted to the pressure chambers 13 and 14 in order to provide a fluid power assist for rotational movement of the steering spindle 4 in a manner generally well known in the art. Pressurized fluid is supplied to the housing by means of an inlet port 17 and flows through an inlet passage 18, an annular groove 19 in the valve sleeve to valve groove 20 in the valve slide element 1 for supply to the bores 15 and 16 under control of the valve slide element 1.

Return flow of fluid from one of the pressure chambers 13 and 14 is conducted by return flow valve passages including a radial bore 22 in fluid communication with a valve groove 21 formed in the valve slide element 1 and through the internal chamber of the valve slide element and cross bores 26 in the valve slide element. Thus, fluid displaced from chamber 13 or 14 will be conducted through the passage within the worm shaft 7 to cross bores 23 from which the fluid is conducted through annular groove 24 and outlet port 25 to a fluid reservoir (not shown).

Figure 2:
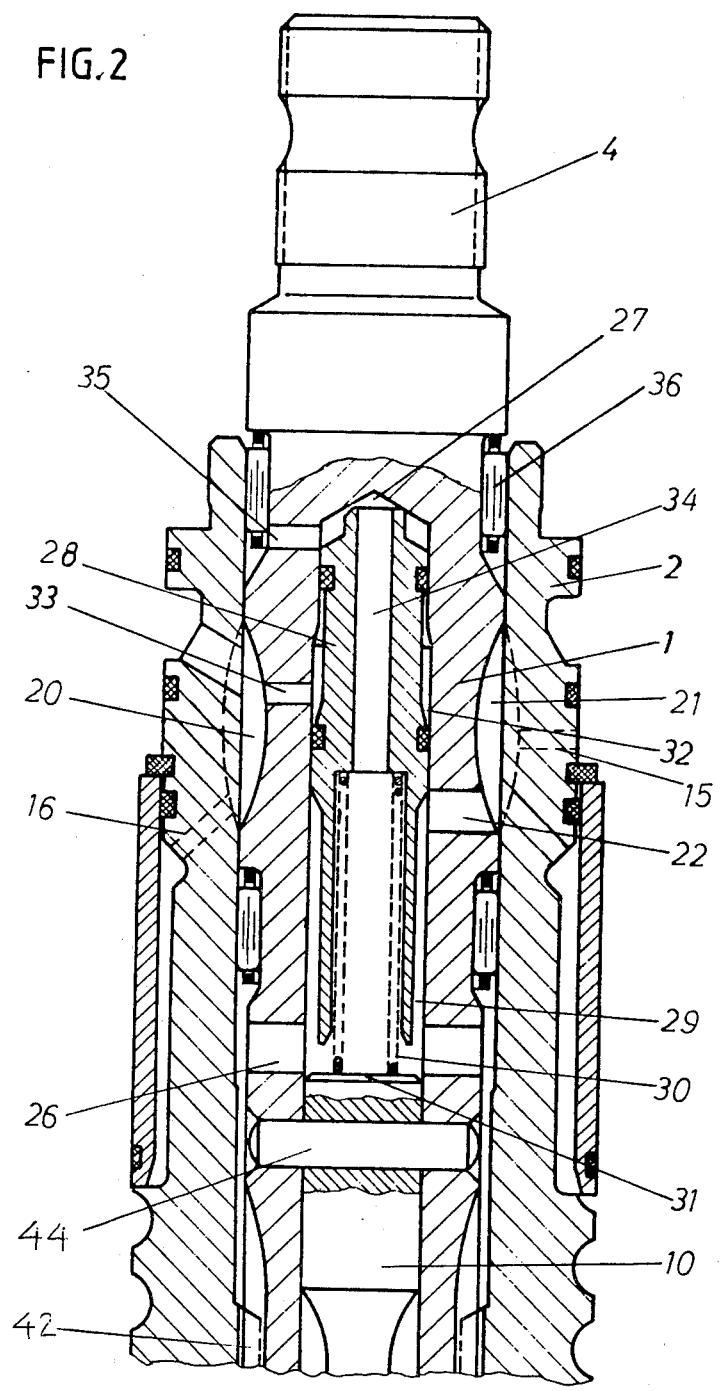
FIG. 2 is an enlargement of a portion of the mechanism shown in FIG. 1.

As more clearly seen in FIG. 2, the valve slide element 1 is provided with an internal axial bore 27 having stepped diameter portions. A valve piston 28 is slidably mounted within the bore 27 having smaller diameter end portions and a large diameter intermediate portion. Along one axial end portion, a gap 29 is formed within the bore 27. The valve bore 22 within the valve slide element 1 aforementioned, establishes fluid communication between the gap 29 and the groove 21. The fluid return flow path therefore extends transversely from the groove 21 through the bore 22 and gap 29 and cross bores 26 to the space within the worm shaft about the torsion bar 10 to the outlet port 25. A spring 30 is seated within the valve piston 28 and engages an end face 31 of the torsion bar 10 in order to exert a bias on the valve piston 28 in a right-hand direction as viewed in FIG. 2. The end portion of the valve piston 28 opposite the gap 29, which is also of a reduced diameter, has an annular space 32 formed thereabout. The inlet valve passage aforementioned also includes a pressurized fluid supply bore 33 extending from the groove 20 in the valve slide element 1 to supply fluid under operating pressure to the space 32. Since the axial bore 27 within the valve slide element has a smaller diameter at the right-hand end of valve space 32, a differential piston actuating pressure force is exerted on the valve piston in a left-hand direction of return flow, opposed by the bias of spring 30. The size of the space 32, the relative diameters of the bore 27 and valve piston 28, and the strength of the spring 30 are so related that a pressure buildup in space 32 causes the valve piston 28 to be axially displaced against the bias of spring 30 in said direction of return flow of the fluid. The pressure buildup in space 32 occurs in response to angular displacement of valve element 1 from the neutral position as aforementioned, to open the inlet port 17 to groove 20 and block port 25 therefrom. As a result, the valve bore 22 within the valve slide element 1 is partially closed to throttle or restrict any return flow of fluid and produce a buildup of pressure in bore 22 dependent on the level of the operating pressure. In this manner, the development of hissing noises resulting from a sharp drop in pressure is avoided at the valve surfaces of the groove 21 during operation of the control valve and servo assembly.

When a steering maneuver is completed, the valve element 1 returns to the neutral position so that the fluid pressure within the fluid return passages aforementioned will prevail throughout the system. As a result, pressure in space 32 drops so that the valve piston 28 is returned to its starting position as shown under the bias of spring 30 restoring unrestricted flow through the valve bore 22 between the groove 21 and gap 29. The axial length of the valve piston 28 is selected so that the end face 31 of the torsion bar will form a stop limiting the axial stroke of the valve piston. Accordingly, the extent to which flow through the bore 22 is restricted or throttled, is limited by a desired amount.

The valve piston 28 is also provided with an axial bore 34 which extends completely therethrough establishing fluid communication between the return flow passages and the bearings 36 and 37 through bore 35. The bearings 36 and 37 respectively journaling the valve slide element 1 within the valve sleeve 2 and the valve sleeve 2 within the housing, are in fluid communication with the axial bore 34. In this way, lubricating fluid and leakage fluid at the bearings will be recycled through the return flow passage.

What is claimed is:

1. In a servo gear mechanism having a housing (40) provided with inflow and outflow ports (17, 25), a valve element (1) provided with passages conducting a pressure medium from the inflow port through a valve sleeve (2) to a servomotor (3, 13, 14) from which a return flow of the pressure medium to the outflow port is conducted, and a torsion bar (10) interconnecting the valve element and the valve sleeve, the improvement residing in said valve element having an axial bore (27) in fluid communication with said outflow port (25) and a return flow valve passage (21, 22) in the valve element, a valve piston (28) disposed in said axial bore, a spring (30) biasing the valve piston against flow of the pressure medium to a position permitting unrestricted return flow through said valve passage, said valve piston having pressure surface means (32) for exerting a piston actuating force thereon opposed by the spring, and pressure passage means (20, 33) in the valve element and the valve sleeve for conducting the pressure medium from the inlet port to the pressure surface means.

2. The servo steering gear mechanism as defined in claim 1 wherein said pressure surface means exerts a piston actuating force in the direction of the return flow.

3. The servo steering gear mechanism as defined in claim 2 wherein said torsion bar has an end face (31) acting as a stop limiting movement of the valve piston.

4. The servo steering gear mechanism as defined in claim 3 wherein the valve piston is provided with an axial through-flow bore (34), and bearings (36, 37) rotatably supporting the valve element and the valve sleeve in the housing, said bearings being in fluid communication with the axial bore.

5. The servo steering gear mechanism as defined in claim 1 wherein said torsion bar has an end face (31) acting as a stop limiting movement of the valve piston.

6. The servo steering gear mechanism as defined in claim 2 wherein the valve piston is provided with an axial through-flow bore (34), and bearings (36, 37) rotatably supporting the valve element and the valve sleeve in the housing, said bearings being in fluid communication with the axial bore.

7. The servo steering gear mechanism as defined in claim 1 wherein the valve piston is provided with an axial through-flow bore (34), and bearings (36, 37) rotatably supporting the valve element and the valve sleeve in the housing, said bearings being in fluid communication with the axial bore.

8. In combination with a steering control and servo assembly having a housing (40), a pair of relatively rotatable valve elements (1 and 2) rotatably mounted in the housing, a servomotor (3) with respect to which inflow of fluid is conducted along an inlet valve passage (20) and outflow of fluid is conducted along a return flow valve passage (22) formed in the valve elements, the improvement residing in fluid pressure actuated valve means (28) mounted within one of the valve elements (1) for controllably restricting said outflow through the return flow valve passage, to reduce noise produced by said outflow through the return flow valve passage, differential pressure actuating means (32) connected to the inlet valve passage for displacing the valve means to a flow restricting position in the direction of said outflow through the return flow valve passage, and means (30) for continuously biasing the valve means to a position permitting unrestricted outflow through the return flow valve passage.

9. The combination of claim 8, including bearings means (36, 37) rotatably supporting the valve elements within the housing, and passage means (34, 35) in the valve means and one of the valve elements for establishing fluid communication between the bearing means and the return flow valve passage.

* * * * *